United States Patent
Kolev et al.

(10) Patent No.: US 9,120,687 B2
(45) Date of Patent: Sep. 1, 2015

(54) POLYMER INCLUSION MEMBRANES FOR USE IN PROCESSES FOR TREATING THIOCYANATE CONTAINING AQUEOUS SOLUTIONS

(71) Applicants: Spas Dimitrov Kolev, Carlton (AU); Robert Walter Cattrall, Carlton (AU); Youngsoo Cho, Carlton (AU)

(72) Inventors: Spas Dimitrov Kolev, Carlton (AU); Robert Walter Cattrall, Carlton (AU); Youngsoo Cho, Carlton (AU)

(73) Assignee: The University of Melbourne, Victoria (AU)

(*) Notice: Subject to any disclaimer, the term of this patent is extended or adjusted under 35 U.S.C. 154(b) by 0 days.

(21) Appl. No.: 14/316,047

(22) Filed: Jun. 26, 2014

(65) Prior Publication Data

US 2014/0339154 A1    Nov. 20, 2014

Related U.S. Application Data

(62) Division of application No. 13/816,714, filed as application No. PCT/AU2011/001034 on Aug. 12, 2011, now Pat. No. 8,829,061.

(30) Foreign Application Priority Data

Aug. 13, 2010 (AU) ................. 2010903632

(51) Int. Cl.

| | |
|---|---|
| C02F 1/42 | (2006.01) |
| C02F 1/58 | (2006.01) |
| B01D 69/08 | (2006.01) |
| B01D 71/16 | (2006.01) |
| B01D 71/30 | (2006.01) |
| B01D 71/58 | (2006.01) |
| C02F 1/44 | (2006.01) |
| C02F 101/10 | (2006.01) |
| C02F 101/18 | (2006.01) |
| C02F 103/10 | (2006.01) |
| C02F 103/36 | (2006.01) |
| C02F 103/16 | (2006.01) |

(52) U.S. Cl.
CPC . *C02F 1/42* (2013.01); *B01D 69/08* (2013.01); *B01D 71/16* (2013.01); *B01D 71/30* (2013.01); *B01D 71/58* (2013.01); *C02F 1/58* (2013.01); *B01D 2325/16* (2013.01); *B01D 2325/42* (2013.01); *C02F 1/44* (2013.01); *C02F 2001/422* (2013.01); *C02F 2101/101* (2013.01); *C02F 2101/18* (2013.01); *C02F 2103/10* (2013.01); *C02F 2103/16* (2013.01); *C02F 2103/365* (2013.01)

(58) Field of Classification Search
CPC ........ C02F 1/42; C02F 1/58; C02F 2101/101; C02F 2001/422; B01D 69/08; B01D 71/16; B01D 71/30; B01D 71/58
USPC ....................................... 521/27; 210/500.23
See application file for complete search history.

(56) References Cited

FOREIGN PATENT DOCUMENTS

| JP | 63021216 | 1/1998 |
|---|---|---|
| SU | 1096229 A | 6/1984 |
| WO | WO 2005/100243 | 10/2005 |

OTHER PUBLICATIONS

Nghiem et al. "Extraction and transport of metal ions and small organic compounds using polymer inclusion membranes (PIMs)", Journal of Membrane Science 281 (2006), pp. 7-41.*
Pereira, et al., Influence of the composition of polymer inclusion membranes on their homogeneity and flexibility, Desalination 236 (2009) 327-333.

* cited by examiner

*Primary Examiner* — Michael M Bernshteyn (57) ABSTRACT

The present invention generally relates to the field of water treatment, and in particular to polymer inclusion membranes for use in industrial processes which generate aqueous solutions containing thiocyanate (SCN). The invention particularly relates to polymer inclusion membranes for use in processes for treating aqueous solutions containing SCN and more specifically polymer inclusion membranes comprising
(i) about 10-20% wt/wt of a quaternary ammonium salt of formula (I)

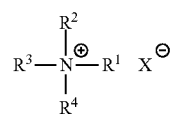

(1)

wherein $R^1$-$R^4$ are independently alkyl chains and $X^\ominus$ is an anion;
(ii) about 5-30% wt/wt of a plasticizer/modifier; and
(iii) about 50% wt/wt of a polymer selected from the group consisting of poly(vinyl chloride), cellulose triacetate, and derivatives thereof.

8 Claims, 7 Drawing Sheets

POLYMER INCLUSION MEMBRANES FOR USE IN PROCESSES FOR TREATING THIOCYANATE CONTAINING AQUEOUS SOLUTIONS

CROSS-REFERENCE TO RELATED APPLICATIONS

This application is a divisional of U.S. patent application Ser. No. 13/816,714, filed Feb. 12, 2013, which is a national stage application under 35 USC 371 of International Application NO. PCT/AU2011/001034 filed Aug. 12, 2011 and claims the benefits of Australian Patent Application No. 2010903632, filed Aug. 13, 2010; each of which is incorporated by reference in its entirety for all purposes.

FIELD OF THE INVENTION

The present invention generally relates to the field of water treatment, and in particular to industrial processes which generate aqueous solutions containing thiocyanate (SCN). The invention particularly relates to processes for treating aqueous solutions containing SCN and more specifically treatment processes to extract and remove SCN from said aqueous solutions.

BACKGROUND OF THE INVENTION

Thiocyanate (or $SCN^\ominus$, referred to herein as 'SCN') is a major constituent in waste water produced by many industrial processes. Some industrial waste water, such as those from the steel industry, petrochemical industry and water (effluent) produced through the gasification of coal, often contains a significant concentration of SCN. SCN is a common cyanide reaction product of industrial waste water (or effluent) where cyanide ($CN^\ominus$, referred to herein as 'CN') is used.

While SCN, at concentrations up to 0.1 mg/L, is often not regarded as being toxic, it can be converted to the highly toxic and volatile cyanogen chloride (CNCl) at high pH. Also, oxidation of SCN may release toxic hydrogen cyanide gas (HCN). At concentrations of 50 mg/L SCN has been reported to significantly interfere with the biochemical oxygen demand (BOD) of water systems having an adverse affect on aerobic aquatic organisms.

The thiocyanate anion is often produced naturally when industrial CN comes into contact with a natural source of sulfide. The main occurrence of such a process is where CN is used as an extractant in mining processes such as in the extraction of precious metals such as silver and gold from their respective ores.

As the toxicological and physiological importance of thiocyanate has become more and more evident and understood, there is an increasing interest in the removal of this anion from, in particular, industrial waste water. One of the known treatments involves the degradation of thiocyanate by microbiological oxidation (with use of, for example, *thiobacillus thioparus*). However the degradation conditions are finely balanced and the treatment may be very expensive and complex. A further method of removing thiocyanate ions from waste water involves solvent extraction, which is based on the principle of extraction of thiocyanate ions into another immiscible phase (generally organic). Solvent extraction of thiocyanate ions with quaternary ammonium salts has been reported and employed on an industrial scale, however the environmental and safety-related drawbacks of this method are numerous. For example, the large quantities of flammable and toxic solvents required present a considerable chemical hazard. Also, the extractants themselves are often toxic, corrosive and cause long term adverse effects if released in the environment.

The present invention seeks to overcome at least some of the shortcomings of the known SCN extraction processes.

SUMMARY OF THE INVENTION

The present invention provides a process for decreasing the concentration or complete removal of thiocyanate ($SCN^\ominus$, referred to herein as 'SCN') from an aqueous solution containing thiocyanate (for example, thiocyanate containing industrial waste water) by using a polymer inclusion membrane which can effectively extract thiocyanate from the aqueous solution.

Accordingly, in one aspect the present invention provides a process for the extraction of thiocyanate from an aqueous solution containing thiocyanate which has a pH of from 7 to 10, said process comprising the step of treating the aqueous solution with a polymer inclusion membrane (PIM), for a time and under conditions such that at least a portion of the thiocyanate is extracted, wherein the PIM is characterised by having a quaternary ammonium salt immobilised in a polymer.

BRIEF DESCRIPTION OF THE DRAWINGS

FIG. 6. Results for the first (●) and tenth (○) cycles of extraction and back-extraction for PIMs (400±10 mg and diameter of 65 mm) incorporating 20% Aliquat 336, 70% PVC and 10% 1-dodecanol (FIG. 6A) and Results for the first (●) and tenth (○) cycles of extraction and back-extraction for PIMs (400±10 mg and diameter of 65 mm) incorporating 1-tetradecanol (FIG. 6B) (Solution volume—250 mL; back-extracting reagent—1.0 M $NaNO_3$).

DESCRIPTION OF THE INVENTION

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavour to which this specification relates.

The present invention is predicated on the discovery that thiocyanate (SCN) can be efficiently and selectively removed from an aqueous solution containing SCN and other common anions such as chloride, nitrate and sulphate with the use of a PIM which is characterised by having a quaternary ammonium salt immobilised in a polymer. The quaternary ammonium salt acts as an SCN extractant.

Nature of the PIM

Polymer inclusion membranes are generally known in the art, and may also be referred to as "polymer liquids", "gelled liquids", "polymeric plasticized", "fixed-site carriers" or "solvent polymeric membranes". The main advantage of PIM's over, for instance, supported liquid membranes (SLMs) is their stability. Also, unlike bulk liquid membranes (BLMs), PIMs are generally not characterised as having low interfacial surface areas and mass transport rates. PIMs also do not suffer the problem of emulsion breakage which tends to plague emulsion liquid membranes (ELMs).

PIMs according to the present invention are generally formed by mixing (casting) a solution which contains the SCN extractant (ie the quaternary ammonium salt), a plasticizer/modifier and a base polymer. The casting process is typically facilitated with the use of organic solvents (such as ethers (eg THF, diethylether) and chlorinated solvents (eg dichloromethane)), which are typically removed during membrane formation (eg by air drying or in vacuo).

It will be appreciated that the "extraction" and "stripping" (regenerating) processes referred to herein involve the controlled transport of SCN anions into and out of the membrane. These processes are facilitated by a carrier (referred to herein as the "extractant") that is essentially a SCN complexing agent or an ion-exchanger. In respect of the PIMs of the present invention this extractant is the immobilised quaternary ammonium salt.

a) Quaternary Ammonium Salt

In an embodiment the quaternary ammonium salt is represented by formula (1):

(1)

where $R^1$-$R^4$ are independent alkyl chains and $X^\ominus$ is an anion.

In a preferred embodiment $R^1$ is $C_1$-$C_4$ alkyl chain, and $R^2$-$R^4$ are independently $C_8$-$C_{30}$ alkyl chains.

In a further embodiment $R^1$ is $C_1$-$C_3$ alkyl chain, and $R^2$-$R^4$ are independently $C_6$-$C_{10}$ alkyl chain, and more preferably $C_8$-$C_{10}$ alkyl chain.

In a further embodiment $X^\ominus$ is anion such as chloride, nitrate or bromide.

In an even more preferred embodiment the immobilised quaternary ammonium salt is Aliquat 336® (Cognis Corp.).

Aliquat 336 is a mixture of compounds of formula (1) where $R_1$ is methyl, $R_2$-$R_4$ are mixtures of $C_8$ (octyl) and $C_{10}$ (capryl) chains (predominantly $C_8$), and $X^\ominus$ is chloride.

In an embodiment the quaternary ammonium salt constitutes from 5-40% wt/wt of the PIM, preferably from about 10%-30% wt/wt and more preferably from about 15-25% wt/wt of the PIM.

b) Polymer

The PIM according to the present invention may be formed from any suitable base polymer which provides mechanical strength to the membrane.

In one embodiment the polymer is selected from poly (vinyl chloride) (PVC), cellulose triacetate (CTA), and cellulose tributyrate (CTB), or suitable derivatives thereof.

In a preferred embodiment the polymer is PVC, CTA or a derivative thereof.

In an embodiment the polymer constitutes from about 40-80% wt/wt of the PIM, preferably from about 50-75% wt/wt, more preferably from about 55-75% wt/wt, and even more preferably about 70% wt/wt.

c) Plasticizer/modifier

The PIM preferably also comprises a plasticizer or modifier component. The role of the plasticizer is to penetrate between polymer molecules and to "neutralize" the polar groups of the polymer with its own polar groups or to merely increase the distance between the polymer molecules and hence reduce the strength of the intermolecular forces. Accordingly, the plasticizer may be any suitable organic compound which is able to function as described above. Suitable organic compounds include those containing a hydrophobic alkyl backbone with one or several highly solvating polar groups. The role of the modifier is to increase the solubility of the extracted chemical species in the membrane liquid phase.

In an embodiment the plasticizer/modifier is selected from the group consisting of 2-nitrophenyl octyl ether (2-NPOE), dibutyl butyl phosphonate (DBBP), 1-hexanol, 1-heptanol, 1-octanol, 1-nonanol, 1-decanol, 1-dodecanol, 1-tetradecanol, o-nitrophenylpentyl ether (oNPPE), tributylphosphate (TBP), dioctylphthalate (DOP), bis(2-ethylhexyl)terephthalate (DDTP), dioctylsebacate (DOS) and tri-(2-ethylhexyl) phosphate(T2EHP).

In an embodiment the plasticizer is selected from TBP, 2-NPOE, 1-tetradecanol and 1-dodecanol.

In an embodiment the plasticizer/modifier constitutes from about 5-40% wt/wt of the PIM, preferably about 5-30% wt/wt and more preferably from about 5-15% wt/wt.

In an embodiment the ratio (based on % wt/wt) of polymer: quaternary ammonium salt:plasticizer/modifier is 5:2:3-7:1: 2.

In a further embodiment the ratio range (based on % wt/wt) of polymer:quaternary ammonium salt:plasticizer modifier is about 7:2:1 to 16:3:1. In a preferred aspect the ratio is about 7:2:1, for instance, a preferred composition is 70% PVC, 20% Aliquat 336 and 10% 1-tetradecanol.

Accordingly, in a further aspect the invention provides novel PIMs for thiocyanate extraction, said PIMs comprising:
  (i) about 10-20% wt/wt of a quaternary ammonium salt of formula (1);
  (ii) about 5-30% wt/wt of a plasticizer/modifier; and
  (iii) about 50% wt/wt of a polymer selected from PVC, CTA and derivatives thereof.

In an embodiment and with reference to the above aspect, (i) is Aliquat 336® chloride, and (ii) is selected from TBP, 2-NPOE, 1-tetradecanol or 1-dodecanol.

d) Optional Other Components

The skilled person would appreciate that the PIMs of the present invention may also include additional components to aid in the extraction or stripping (regenerating or back-extraction) processes. For instance, the PIMs may include other quaternary ammonium salts, plasticizers/modifiers and base polymers, antimicrobial agents (for instance, to inhibit membrane fouling), antioxidants (for increased stability), porosity agents (porogens), ferromagnetic particles, and residual amounts of casting solvents.

In an embodiment, the PIM includes ferromagnetic particles such as iron (Fe) particles. Such particles may aid in the recovery of the PIM after the extraction or stripping processes, as discussed below in more detail.

The Processes a) Extraction of SCN

The extraction process according to the present invention comprises the step of treating an aqueous solution (containing thiocyanate) with the PIM (as characterised above). The term "treating" as used herein (and with reference to the processes of the present invention) includes any means by which the aqueous solution comes into contact with the PIM such that the SCN from the aqueous solution can be extracted by the PIM. It would be appreciated that the extraction process involves ion-exchange chemistry between the anion of the extractant (ie the chloride anion of quaternary ammonium chloride) and the SCN. The quaternary ammonium SCN ion-pair thus formed on the surface of the membrane will diffuse into the bulk membrane. In this respect the SCN can be thought of as essentially being accumulated in the bulk of the membrane and on its surface.

Treatment in the above manner includes adding, physically contacting, or dispersing the PIM with or into the aqueous solution (for instance, in a batchwise extraction process) or allowing a flow of the aqueous solution to come into contact with a surface of the PIM (such as in a continuous extraction process). Possible configurations for batchwise and continuous extraction/stripping (regenerating) processes are discussed below.

The present inventors have found that the extraction process when conducted at a pH of from about 7 to 10, preferably 7.5 to 9.5 and more preferably about 8 provides for optimal SCN extraction as well as stability of the PIM within the SCN solution. In this pH range the preferred PIMs of the present invention are able to maintain their integrity over multiple extractions.

The aqueous solution of SCN is preferably treated with PIM so as to provide the maximum surface area of PIM to absorb (and hence extract) the SCN. Preferably the treatment process involves dispersing the PIM in the aqueous solution.

Dispersion of the PIM may be achieved by any convenient means and will depend on the form of the PIM (i.e., beads, hollow fibres, flat sheets, plates, etc). For instance if the PIM are in the form of beads, the PIM beads may be dispersed by mechanical agitation such as stirrers and the like or with the use of mixing pumps immersed in the aqueous solution, or by the use of gas (eg air) bubbled through the aqueous solution. Sufficient shear forces will need to be imparted on the solution to optimise dispersion of PIM beads.

Flat sheet membranes may be prepared by pouring of a polymer solution into a frame made of glass or other suitable material positioned on a flat surface (glass, Teflon or other suitable material). The thickness of the resulting PIM is determined by the dimensions of the frame and the volume and concentration of the polymer solution used. A membrane film is obtained after evaporation of the solvent in the ambient air or in a chamber where temperature and humidity are controlled.

Composite flat sheet membranes with enhanced mechanical strength and stability can be produced by coating a porous membrane support made of the base polymer in the polymer solution. One side of the support membrane will be exposed to the polymer solution, then the excess solution will be mechanically removed and the solvent will be left to evaporate. It can be expected that these composite PIMs will have a longer lifetime than conventional PIMs if the coated surface is exposed to the receiver solution while the mechanically stronger bare surface faces the process wastewater which may contain suspended particulate matter.

The hollow fibre membranes can be homogeneous or composite. The manufacturing of homogeneous hollow fibre PIMs will be based on modified published procedures which involve spinning the polymer solution and subsequent dry/wet phase inversion. During this process the polymer solution is extruded through the annular orifice of the spinneret towards a precipitation bath (e.g. aqueous solution in the case of PVC based hollow fibres) where the solvent used dissolves. To obtain the fibre lumen a bore liquid (e.g. identical to that of the precipitation bath) is co-extruded through the inner orifice of the spinneret. From the precipitation bath, the hollow fiber passes through a rinsing bath (e.g. water), and afterwards it is placed in a storage tank.

The development of composite hollow fibre PIMs can be based on propelling a polymer solution through commercially available or in-house manufactured porous hollow fibres. The polymer solution penetrates the pores and forms a thin film on the inside walls of the follow fibres. The evaporation of the solvent can be facilitated by a gentle air flow through the fibre lumen.

Another approach can be based on dip-coating where a suitable hollow fibre membrane is immersed in the polymer solution and then exposed to ambient air or air with controlled humidity and temperature to allow evaporation of the solvent and formation of a thin polymer inclusion membrane film coating the hollow fibre.

Accordingly in an embodiment the PIM is presented in the form of a hollow fibre membrane. Density of the hollow fibre membrane may be up to 30,000 $m^2/m^3$. The excellent mass-transfer properties provided for by the hollow fibre configuration means that such membranes can be used in large scale continuous SCN extraction processes.

In another embodiment the PIM is presented in the form of PIM beads which have a diameter of less than 100 μM, and preferably in a range of from 20 μM to 80 μM. This size range provides a PIM which can be readily dispersed in an aqueous solution (eg water) and one which is suitable for subsequent separation from the aqueous solution. The size of the PIM beads may affect the kinetics of adsorption of SCN and the effectiveness of separation and stripping of SCN (ie the regeneration of the beads). The optimal size may be determined by routine experimentation. The beads may be solid PIM beads or beads which are produced by coating PIM unto a substrate (eg glass or another polymer). In one embodiment the PIM beads may be PIM coated glass beads.

Homogenous beads can be made by a procedure in which the polymer solution is delivered drop-wise with a syringe pump through a needle into a precipitation tank. The flow rate controls the drop size and hence the resulting diameter of the beads. As the drops settle to the bottom of the tank the solvent dissolves in the precipitation solution and spherical, solid beads are collected on the bottom. In the case of PVC beads the solvent THF dissolves in dionized water with a low surfactant concentration to prevent bead aggregation.

Composite extracting beads consist of a solid polymer core and a thin PIM coating. Commercially available solid polymer beads or manufactured by the procedure outlined above can be used as the solid polymer core. The base polymer in the coating can be identical to or different from the polymer of the bead core. Two approaches for coating the solid beads can be applied. The first one includes propelling of the polymer solution through a column loosely packed with solid beads and then emptying the column into a mechanically stirred precipitation solution similarly to the procedure for the production of homogeneous beads. The second approach involves spraying the solid beads with the polymer solution in a fluidized bed reactor. This reactor consists of a vertical cylinder with distributor plates (plates with numerous small holes) at both ends to confine the core beads within the reactor. An air flow through the distributor plate at the bottom of the reactor at sufficiently high upwards velocity mantains the core beads in a suspended (fluidized) state. This also facilitates the evaporation of the solvent and prevents the beads from aggregating.

In the extraction process of the present invention the amount of PIM necessary to completely (or substantially completely) remove SCN from an aqueous solution containing SCN will be dependent on a number of factors including the level of SCN initially present in the solution to be treated, the form and nature of the PIM, the desired level of SCN in the treated aqueous solution, salinity, temperature, the number of cycles of treatment prior to a stripping (ie regeneration) step, and the rate at which it is desired to treat the aqueous solution to remove SCN.

Typically, the amount of PIM used to substantially remove (ie >90%) from an aqueous solution containing SCN will be in the range of from 10 to 40 g of PIM (in the form of beads) per litre of an aqueous solution which contains around from 400-900 mg/L of SCN. Although the person skilled in the art would appreciate the high concentrations of PIM may also be useful in removing higher concentrations of SCN, such higher concentrations allow shorter contact times and possibly more effective SCN extraction.

b) Separating the Absorbed SCN from the Aqueous Solution

Once used in an extraction process the PIM is said to be loaded with SCN (ie loaded or spent PIM).

In a further embodiment, the process of the present invention involves an additional step of physically separating the spent PIM from the aqueous solution.

Accordingly, in a further aspect the present invention provides a process for the extraction and removal of thiocyanate from an aqueous solution containing thiocyanate which has a pH of from 7.5 to 9.5, said process comprising:
 (i) treating the aqueous solution with a polymer inclusion membrane (PIM) characterised by having a quaternary ammonium salt immobilised in a polymer, for a time and under conditions such that at least a portion of the thiocyanate is extracted by the PIM; and
 (ii) physically separating the spent PIM from the aqueous solution.

Physical separation may be achieved by allowing the spent PIM to settle or by simply filtering through a mesh of appropriate porosity. Other means for separation and collection of the spent PIM include the use of vacuum collectors, magnetic transport (for instance where the PIM comprises magnetic particles), belts, pipes, disks, drums, auger screws, etc. Whatever the means it is preferred that the separation and collection process does not (to any great extent) cause mechanical wear which may lead to attrition of the PIM.

After removal of the SCN, the treated aqueous solution (i.e., for instance, treated industrial waste water) may be of acceptable quality for safe discharge into a natural water system (e.g. river or ocean) or may be subjected to further treatment steps (e.g. filtration, disinfection, coagulation, etc). This treated water may also be recycled into a further industrial process step (for instance, the regeneration step discussed herein). As a further possible use the water may be treated with cyanide (solid briquettes or flakes) on site and reused in, for instance, gold processing.

c) Regeneration ("Stripping") of Spent PIM

Preferred PIMs are recyclable and regenerable. Recyclable PIMs can be used multiple times without regeneration and continue to be effective in adsorbing SCN. The present inventors have found that depending on the amount and form of the PIM used in the extraction process, the PIM of the present invention can be effectively recycled at least 10 times prior to stripping (regeneration). Regenerable PIMs are capable of treatment to remove absorbed SCN (i.e., stripping or back-extractions) and such regenerated PIM can then be re-introduced into the extraction process.

In a further embodiment the process of the present invention additionally includes a stripping (regenerating) step in order to regenerate the spent PIM.

Accordingly, in a further aspect the present invention provides a process for the extraction and removal of thiocyanate from an aqueous solution containing thiocyanate which has a pH of from 7.5 to 9.5, said process comprising:
 (i) treating the aqueous solution with a polymer inclusion membrane (PIM) characterised by having a quaternary ammonium salt immobilised in a polymer, for a time and under conditions such that at least a portion of the thiocyanate is extracted by the PIM;
 (ii) physically separating the spent PIM from the aqueous solution; and
 (iii) regenerating the spent PIM.

The regenerating (or stripping) step refers to a process in which the ion-exchange capacity of the spent (or SCN loaded) PIM is returned to a level whereby it is rendered suitable for use in subsequent SCN extraction processes. Generally, the regeneration of the spent PIM involves the displacement (or exchange) of the adsorbed SCN, with anions. Accordingly, the term "regenerant" as used herein refers to any agent which has the capacity to increase the SCN adsorbing (or extracting) ability of the spent PIM by removing adsorbed SCN from the PIM, and therefore free up ion-exchange sites which can extract (or adsorb) further SCN. The preferred regenerants are concentrated inorganic salt solutions. Preferably the regenerant is a sodium nitrate solutions (preferably in a range of 0.1-1 mol/L), other metal nitrates or metal chlorides (sodium and potassium). Accordingly, the by-product of this regeneration process is the spent regenerant solution which will be a concentrated salt solution containing SCN.

Purified thiocyanate salts from this regeneration process can be used in other industrial processes. For instance, NaSCN may be recovered from the regeneration process and used in the production of pharmaceuticals and pesticides (as a raw ingredient), synthetic fibre manufacture (a spinning solvent for polyacrylonitrile), electroplating, photography or as an accelerator in concrete production. Other thiocyanate salts are equally useful.

In an embodiment the extraction and regeneration processes according to the present invention may be conducted in a batchwise manner where, for instance, a column or pipe of PIM is washed or dispersed within a regenerant or aqueous solution containing SCN.

Alternatively the processes are preferably carried out in a continuous manner. In continuous processes involving such ion-exchange membranes (PIMs) the raw water (or SCN containing aqueous solution) is generally fed into a continuously stirred tank (contactor) which has a nominal residence time usually of between about 5 and 60 minutes. The PIMs may be added either directly into this tank or into the raw water in the pipeline feeding this tank. It is in this tank that the majority of the ion-exchange process occurs. Prior to treatment with the PIMs the water will generally have been screened to remove large particles to protect pumps involved in pumping the water to the treatment plant. It is also possible that the water will have been subjected to one or more pretreatment steps, such as coagulation/flocculation.

From the contactor, the PIMs and water (PIM suspension) may be passed to a separating stage (e.g. a settler) where the PIMs can be recovered and recycled. Depending on the density and form of the PIMs it may be possible to recover the PIMs using gravity sedimentation. Magnetic PIMs would have a strong tendency to agglomerate to form large and fast settling particles, when shear is removed (as occurs in the settler). The agglomerated PIMs may settle rapidly and can be collected on the bottom of the settler where they may be transferred (e.g. by pumping) back to the head of the treatment plant for reuse in the process. At least a portion (and generally a small portion) of the flow which is to be recycled back to the head of the plant may be removed and subjected to a regeneration process. To keep the PIM concentration at the required level, fresh or regenerated PIM may be added to the contactor to make up for the PIM not being returned. This ensures the performance of the process is maintained. The PIM, after it has been regenerated, may be sent to a "fresh" PIM tank before it is added back into the process to make up for PIM being sent for regeneration.

In the aforementioned continuous systems the flow of PIM may be counter-current to the flow of the treatable water (i.e., the aqueous solution containing SCN) or the regenerant.

The PIMs outlined above can be used for continuous on-line clean-up of industrial waste waters contaminated with SCN in membrane or packed-bed modules.

1) Flat Sheet or Hollow Fibre Membrane Modules

Flow-through modules incorporating parallel plate flat sheet PIM stacks where the stripping solution and the waste water flow counter- or co-currently on the opposite sides of the flat sheet PIMs.

Bundled hollow fibre modules where the stripping solution (eg $NaNO_3$ solution) flows continuously through the fibres while the contaminated with SCN waste water flows continuously around the fibres counter- or co-currently to the stripping solution flow. A configuration where the sides of the stripping solution and the waste water are swapped is also possible.

In both types of modules outlined above the extraction and back-extraction (stripping) steps take place simultaneously.

2) Flow-Through Packed-Bed Modules

These are packed-bed reactors filled with packing which consist of the extracting polymer used for making PIMs or are coated with this material. An example of such packing is a load of beads which consist of the extracting polymer used for making PIMs or are coated with this material. Contaminated with SCN waste water flows through these reactors until the extracting polymer is saturated with SCN after which a stripping solution (eg $NaNO_3$ solution) is flown through the reactor to back-extract the retained SCN and thus regenerate the extracting PIM.

The invention will now be further described with reference to the figures and the following non-limiting examples. However, it is to be understood that the particularity of the following description of the invention is not to supersede the generality of the preceding description of the invention.

Examples 1.1. Reagents

Aliquat 336 (Aldrich), 2-nitrophenyl octyl ether (2-NPOE) (Aldrich), tributylphosphate (TBP) (LR, Unilab, Australia), dibutyl butyl phosphonate (DBBP) (Fluka), 1-hexanol (Sigma), 1-heptanol (ICN Biomedicals), 1-octanol (Fluka), 1-nonanol (Fluka), 1-decanol (Aldrich) 1-dodecanol (Aldrich) and 1-tetradecanol (Aldrich) were used as received. Tetrahydrofuran (THF) (HPLC grade, Merck, 99.9%, Scharlau, Spain), dichloromethane (DCM) (Merck, GR, Australia), high molecular weight poly(vinyl chloride) (PVC) (Fluka) and cellulose triacetate (CTA) (Fluka) were used in the preparation of PIMs. Other chemicals used in this study were hydrochloric acid (Merck), sodium hydroxide (Merck), potassium thiocyanate (BDH, Australia), sodium nitrate (Chem-supply, Australia), ferric chloride (BDH, Australia), pH 4, 7, and 10 calibration standards (Merck).

Deionized water (Synergyl 85 Millipore, 18.2 MΩ cm) was used in solution preparation.

1.2. Instrumentation

A flow injection (FI) system (FIG. 1) was used for the determination of the concentration of thiocyanate. A low-pressure injection valve (Rheodyne, Model 5020, USA) equipped with a 100 μL sample loop was connected to a peristaltic pump (Alitea, Model VS4-10R-Midi, Sweden) with 1.14 mm internal diameter Tygon pump tubing (TACS, Australia). Teflon tubing (0.5 mm internal diameter, Supelco, USA) was used for connecting the flow-through sections of the FI system and for constructing the 1 m mixing coils with a coil diameter of 1 cm.

Figure 1:
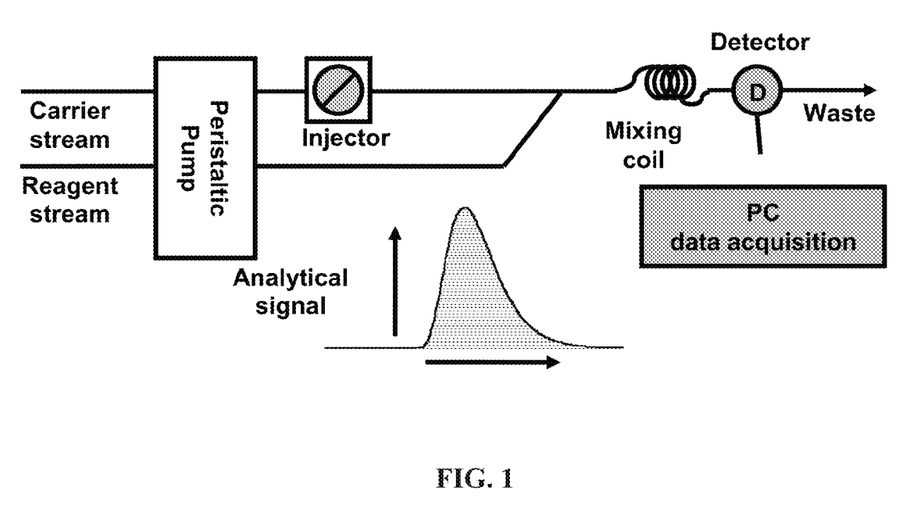
FIG. 1. Schematic of the Flow Injection system for the determination of $SCN^-$.

Samples were injected into a carrier stream containing deionized water (flow rate, 1.02 mL/min) which was then merged with a reagent stream containing 0.1 mol $L^{-1}$ ferric nitrate in 0.1 mol $L^{-1}$ nitric acid (flow rate, 1.05 mL/min). The absorbance of the red $FeSCN^{2+}$ complex was continuously monitored at 480 nm in the quartz flow-through cell (10 mm path-length, Starna, UK) of a UV-Visible spectrophotometer (Model Novaspec II, Pharmacia LKB, Sweden) connected via a data acquisition card (Advantech HG919, Taiwan) to a PC running a home-written in Microsoft C® FI data collection program. A calibration curve was constructed daily in the range of 0-10 mg $L^{-1}$ and samples and standards were analysed in triplicate and where necessary were diluted with deionized water prior to analysis.

The limit of detection of the FI procedure, determined as 3 times the standard deviation of the baseline, was 0.17 mg $L^{-1}$ thiocyanate and the sampling rate was 48 samples/h.

Membrane thickness measurements were made using a Motic SMZ-140 stereo microscope (Motic, China) with 60× magnification in combination with a MotiCam 1000 microscope camera (Motic, China).

An Ionode IJ-44 pH electrode connected to a smartCHEM analyser (TPS, Australia) was used for pH measurements.

A gas chromatograph (Model GC 2010, Shimadzu) equipped with an EC-Wax capillary column (30 cm×0.25 mm×0.25 μm, Alltech) and a flame ionization detector was used in the analysis of the aqueous phase for long chain alkyl alcohols used as PIM modifiers.

1.3. Membrane Preparation

The extractant Aliquat 336, a plasticizer or modifier and either PVC or CTA in varying proportions were weighed into a Pyrex beaker and dissolved in 15 mL of THF or in 20 mL DCM for the preparation of PVC or CTA membranes, respectively. The combined mass of the polymer, extractant and plasticizer (if used) was 800±10 mg. The mixture was stirred by a magnetic stirrer until all components had dissolved. The solution was then poured into a glass ring (internal diameter 76 mm) positioned on a glass plate (10×10 cm). The glass ring was covered with a filter paper to slow the evaporation of the solvent. The solvent was allowed to evaporate overnight and then was peeled from the glass plate. Circular segments with a diameter of 65 mm were cut from the centre of the membranes and used in the extraction and transport experiments.

The thickness of circular membrane segments was measured along their diameters using a digital image of the membrane cross section taken through an optical microscope and compared against a calibration slide with markings of known dimensions. Measurements were taken in triplicate at several points along the membrane cross-section. Membranes were evaluated for their mechanical strength, flexibility and homogeneity [see N. Pereira, A. St John, R. W. Cattrall, J. M. Perera, S. D. Kolev, Influence of the composition of polymer inclusion membranes on their homogeneity and flexibility, Desalination 236 (2009) 327-333.].

All membrane compositions are quoted in mass percentages.

1.4. Membrane Extraction and Back Extraction

Extraction studies were carried out by immersing a 65 mm circular membrane segment (400±10 mg) in a conical flask containing 250 mL of thiocyanate solution and shaking the solution on a platform orbital shaker (OM06, Ratek, Australia). The transient concentration of thiocyanate in the solution was monitored by removing 1.00 mL samples at regular intervals and replacing it with 1.00 mL of deionized water. All extraction experiments were carried out in triplicate. It was found that thiocyanate extraction became faster by increasing the shaking rate from 100 to 175 rpm, however, a shaking rate of 125 rpm and above gave similar extraction rates, hence a 125 rpm shaking rate was used in all subsequent experiments.

The influence of pH on the extraction was investigated by immersing membrane segments in 250 mL of 100 mg $L^{-1}$ thiocyanate (pH 7) adjusted to pH 8, 9, or 10 using 0.1 M NaOH.

Back extraction was studied using thiocyanate loaded membrane segments immersed in 250 mL of solutions containing between 0.1 and 2.0 mol $L^{-1}$ NaCl or NaNO$_3$, respectively. The concentration of thiocyanate in the solution was monitored over time by the sampling procedure outlined above.

A thiocyanate solution with initial concentration of 40 mg $L^{-1}$ in deionized water and in solutions containing 0.5 and 1.0 M NaNO$_3$ was monitored over an 8-hour period to assess its stability.

1.5. GC Analysis

The leaching of long chain alkyl alcohols, used as modifiers, from the membrane into the aqueous phase during PIM extraction of thiocyanate was studied. After completing the membrane extraction process the modifier in the aqueous solution (250 mL) was extracted for 10 min in a separation funnel using 10 mL of dichloromethane as the liquid extractant. The two immiscible phases were left to separate for 10 min and the dichloromethane extract was stored in a flask. This liquid-liquid extraction procedure was repeated 5 times resulting in the collection of 50 mL of dichloromethane extract which was analysed by injecting 1 µL samples into the heated port of the gas chromatograph. The initial temperature of the oven of 120° C. was held for 4 min and then it was increased to 250° C. for 2.6 min and held at this level for 3.4 min thus bringing the total run time to 10 min. Both the detector and injection port temperatures were maintained at 280° C. Calibration curves for all 7 long chain alkyl alcohols studied were prepared in the concentration range from 0 to 480 mg $L^{-1}$.

1.6. Extraction of Thiocyanate from Gold Mine Tailings Water

Gold mine tailings water was obtained from a gold processing plant in the State of Victoria (Australia). The tailings water was at pH 8 and contained 1054 mg $L^{-1}$ thiocyanate, 4.0 mg $L^{-1}$ cyanide, 7.0 mg $L^{-1}$ weak acid dissociable (WAD) cyanide and 104 mg $L^{-1}$ total cyanide. Thiocyanate was extracted as described above after a 10 fold dilution of the tailings water with deionized water.

1.7. Long-Term Stability Studies of the Membrane During Continuous Transport of SCN The membrane separation unit consisted of a polymer inclusion membrane (PIM), 2 identical Teflon blocks and a four channel peristaltic pump. The membrane contained 70% PVC, 20% Aliquat 336 and 10% n-tetradecanol, and the mass of membrane was 300±10 mg. Each block (6.4×6.4 cm) had a groove with a depth of 0.02 cm and a length of 205 cm. The total exposed membrane surface area to each one of the streams (feed and receiving) flowing on both sides of the membrane was 20.49 cm$^2$. When the two blocks were assembled their grooves, separated by the PIM, were facing each other. The feed solution contained thiocyanate at 3 different concentrations: 100, 500 or 1000 mg $L^{-1}$. The receiving aqueous solution contained 1 M sodium nitrate. The flow rates of the two streams, flowing counter currently, were identical and varied in the range of 0.028 mL min$^{-1}$ to 0.263 mL min$^{-1}$. Experiments involving up to 3 membrane separation units connected in a series were conducted. The concentrations of thiocyanate in feed and receiving streams were monitored using flow injection analysis.

2.1. Optimization of the Membrane Composition 2.1.1 Screening of Membrane Compositions for their Ability to Extract and Back-Extract Thiocyanate Twenty eight PVC and CTA membrane compositions including Aliquat 336 as the extractant and 2-NPOE, TBP, DBBP or 1-dodecanol as modifier (Table 1) were studied for their ability to form successful PIMs capable of extracting thiocyanate. Membranes were considered as successful when homogeneous, transparent, flexible and mechanically strong enough to withstand mechanical stress such as bending without tearing or visibly deforming.

TABLE 1

Membrane composition summary.

| Aliquat 336 | Plasticizer/ Modifier | | Base-Polymer | |
|---|---|---|---|---|
| [%] | Conc. [%] | Compound | [%] | Compound |
| 0-30 | 10-50 | 2-NPOE | 40-60 | PVC |
| 10-40 | 10-30 | 1-dodecanol | 40-60 | PVC |
| 0-30 | 10-40 | TBP | 50-80 | PVC |
| 9-30 | 20-55 | 2-NPOE | 30-60 | CTA |
| 0-30 | 10-40 | 1-dodecanol | 40-60 | CTA |
| 10-30 | 10-40 | TBP | 50-60 | CTA |
| 20-30 | 20-25 | DBBP | 50-60 | CTA |

The circular segments of the successful membranes were exposed to 250 mL of solutions containing 100 mg $L^{-1}$ thiocyanate and their physical appearance was monitored for the formation of opaqueness. This phenomenon indicated some degree of incompatibility between the Aliquat 336 thiocyanate ion-pair and the membrane components thus ruling out the corresponding membranes as suitable for the extraction and transport of thiocyanate. According to this criterion only one CTA and four PVC membranes were found to be suitable to further study and these are listed in Table 2.

TABLE 2

Membrane compositions.

| Membrane | Aliquat 336 [%] | Plasticizer Conc. [%] | Plasticizer Compound | Base Polymer Conc. [%] | Base Polymer Compound |
|---|---|---|---|---|---|
| 1 | 10 | 30 | TBP | 60 | PVC |
| 2 | 10 | 30 | 2-NPOE | 60 | PVC |
| 3 | 20 | 20 | 2-NPOE | 60 | PVC |
| 4 | 20 | 20 | 1-dodecanol | 60 | PVC |
| 5 | 20 | 20 | 2-NPOE | 60 | CTA |

Figure 2:
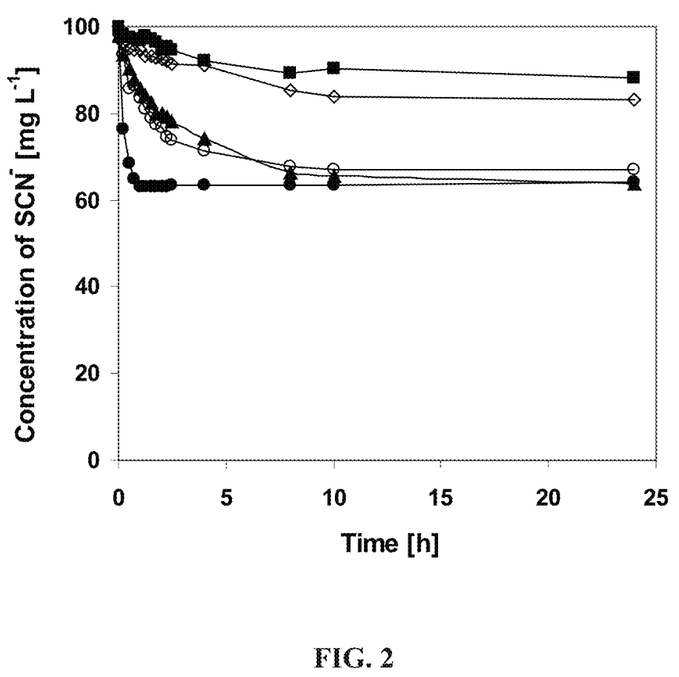
FIG. 2. Extraction of thiocyanate from 250 mL solution of 100 mg $L^{-1}$ solution by PIMs (400±10 mg and diameter of 65 mm) with compositions listed in Table 2 (1—■; 2—◇; 3—▲; 4—●; 5—○).

The extraction performance of the PIMs listed in Table 2 was studied using a thiocyanate solution of concentration 100 mg $L^{-1}$ and the results are shown in FIG. 2 as a plot of the transient solution concentration of thiocyanate. As can be seen, the membrane containing 1-dodecanol as modifier showed superior extraction characteristics with respect to both extraction rate and the amount of thiocyanate extracted.

Figure 3:
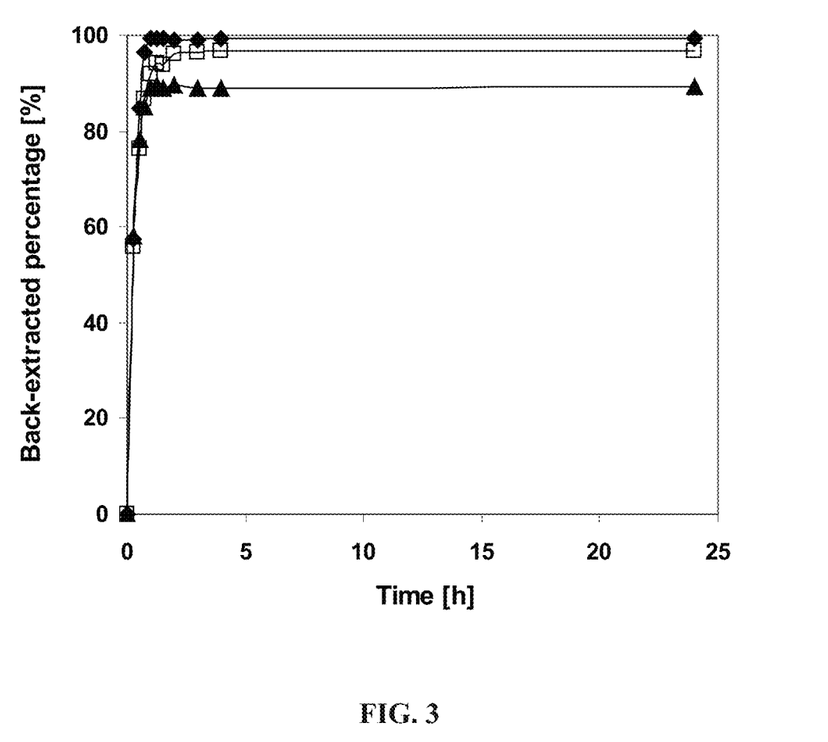
FIG. 3. Back-extraction of thiocyanate from PIMs (400±10 mg; diameter of 65 mm; and composition: 20% Aliquat 336, 20% 1-dodecanol and 60% PVC) using 250 mL of 0.1 M (▲), 0.5 M (□) and 1.0 M (◆) $NaNO_3$ solutions.

The possibility of back-extracting thiocyanate from a PIM consisting of 20% Aliquat 336, 20% 1-dodecanol, 60% PVC was studied using NaCl or $NaNO_3$. It was found that even a 2.0 M NaCl solution was not capable of back-extracting more than 60% of the thiocyanate in the membrane while $NaNO_3$ acted as an efficient back-extracting reagent. The results presented in FIG. 3 show that thiocyanate was quantitatively back-extracted with 1.0 M $NaNO_3$ solution.

The concentration of thiocyanate in deionized water and in 0.5 and 1.0 M $NaNO_3$ solutions did not change significantly statistically at a confidence level of 95% over an 8 hour period. These results indicated that the extraction experiments were not affected by the decomposition of thiocayante.

2.1.2. Optimization of the 1-Dodecanol Based PIM

Figure 4:
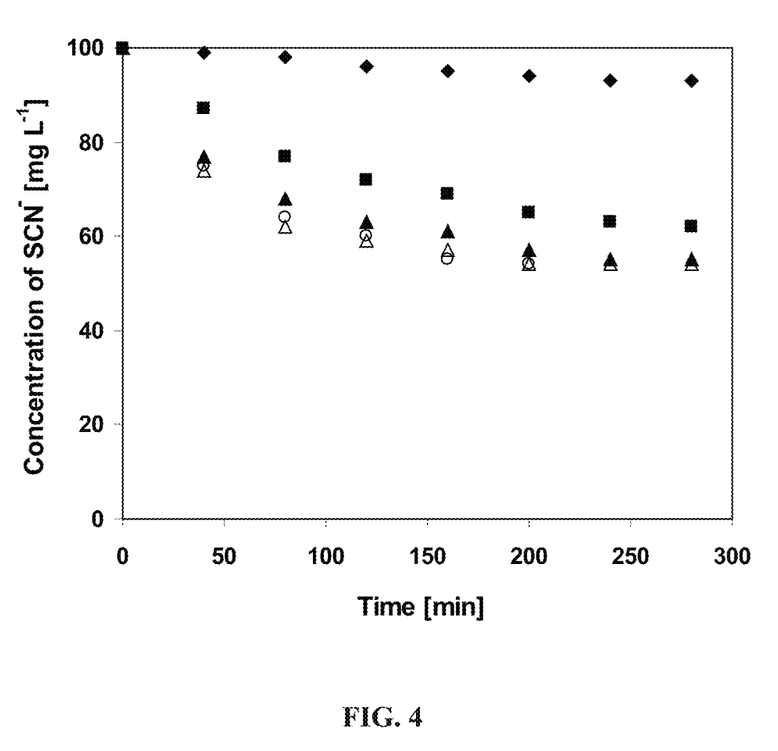
FIG. 4. Extraction of thiocyanate using PIMs (400±10 mg and diameter of 65 mm) containing 20% Aliquat 336 and 80% PVC (◆), 75% PVC and 5% 1-dodecanol (■), 70% PVC and 10% 1-dodecanol (▲), 65% PVC and 15% 1-dodecanol (Δ), or 60% PVC and 20% 1-dodecanol (○).

The effect of the 1-dodecanol concentration on the PIM extraction efficiency was studied by maintaining the concentration of Aliquat 336 at 20% while varying the concentration of 1-dodecanol between 0 and 20%. The extraction curves shown in FIG. 4 indicate that 1-dodecanol did not affect significantly the extraction efficiency when its concentration was equal to or higher than 10%. However, it was noticed that PIMs containing more than 10% modifier developed an oily surface after repeated use while membranes containing higher than 20% (i.e. 25 and 30%) Aliquat 336 while maintaining the 1-dodecanol concentration in the range between 5% and 20% produced cloudy solutions which indicated leaching of the membrane liquid phase. Therefore, it was concluded that the optimal 1-dodecanol based PIM composition included 10% 1-dodecanol, 20% Aliquat 336 and 70% PVC.

2.1.3. Suitability of Long Chain Alkyl Alcohols as Modifiers

It was assumed that similarly to 1-dodecanol, other long alkyl chain alcohols could act as suitable modifiers to further improve the performance of the Aliquat 336/PVC PIM. A range of such alcohols with $C_6$ to $C_{14}$ alkyl chain lengths (i.e. 1-hexanol, 1-heptanol, 1-octanol, 1-nonanol, 1-decanol, 1-dodecanol, and 1-tetradecanol) were tested. Membranes containing 20% Aliquat 336, 70% PVC and 10% of each one of the long alkyl alcohols mentioned above showed very similar rates and degrees of extraction when used for the first time. However, when used in a second extraction experiment after back-extracting the thiocyanate accumulated during the first extraction experiment, only the 1-dodecanol and the 1-tetradecanol based PIMs did not show evidence of deterioration in their extraction properties. The performances of all other membranes were shown to degrade in line with the water solubility of the corresponding long alkyl chain alcohol used as modifier (Table 3). Appreciable amounts of alcohols with shorter alkyl chains were detected in the solutions after thiocyanate extraction (Table 3). However, in the case of 1-dodecanol and 1-tetradecanol the aqueous alcohol concentration was below the limit of detection of the GC based analytical method used. These results confirmed the correlation between membrane stability and the water solubility of the modifier. Since the water solubility of 1-tetradecanol is approximately 13 times lower than that of 1-dodecanol (Table 3) it was expected that 1-tetradecanol PIMs would exhibit better long-term stability than 1-dodecanol based membranes.

TABLE 3

Water solubilities (g $kg^{-1}$) of the long alkyl chain alcohols used as PIM modifiers (normalized with respect to the water solubility of 1-hexanol (7.9 g $kg^{-1}$)) [see CRC Handbook of Chemistry and Physics, $90^{th}$ ed., Eds. D. R. Lide, W. M. Hynes, CRC Press (Taylor & Frances), Boca Raton, 2009.] and the limit of detection of the GC method for each one of them.

| Modifier | 1-Hexanol | 1-Heptanol | 1-Octanol | 1-Nonanol | 1-Decanol | 1-Dodecanol | 1-Tetradecanol |
|---|---|---|---|---|---|---|---|
| Solubility | 1.0 | $3.0 \times 10^{-1}$ | $5.8 \times 10^{-2}$ | $1.6 \times 10^{-2}$ | $4.7 \times 10^{-3}$ | $5.1 \times 10^{-4}$ | $3.9 \times 10^{-5}$ |
| % Loss [%] | 71.6 | 28.7 | 19.6 | 11.7 | 8.7 | <LOD | <LOD |
| LOD [mg $L^{-1}$] | 11.5 | 10.4 | 6.7 | 6.0 | 4.7 | 4.4 | 4.6 |

Figure 5:
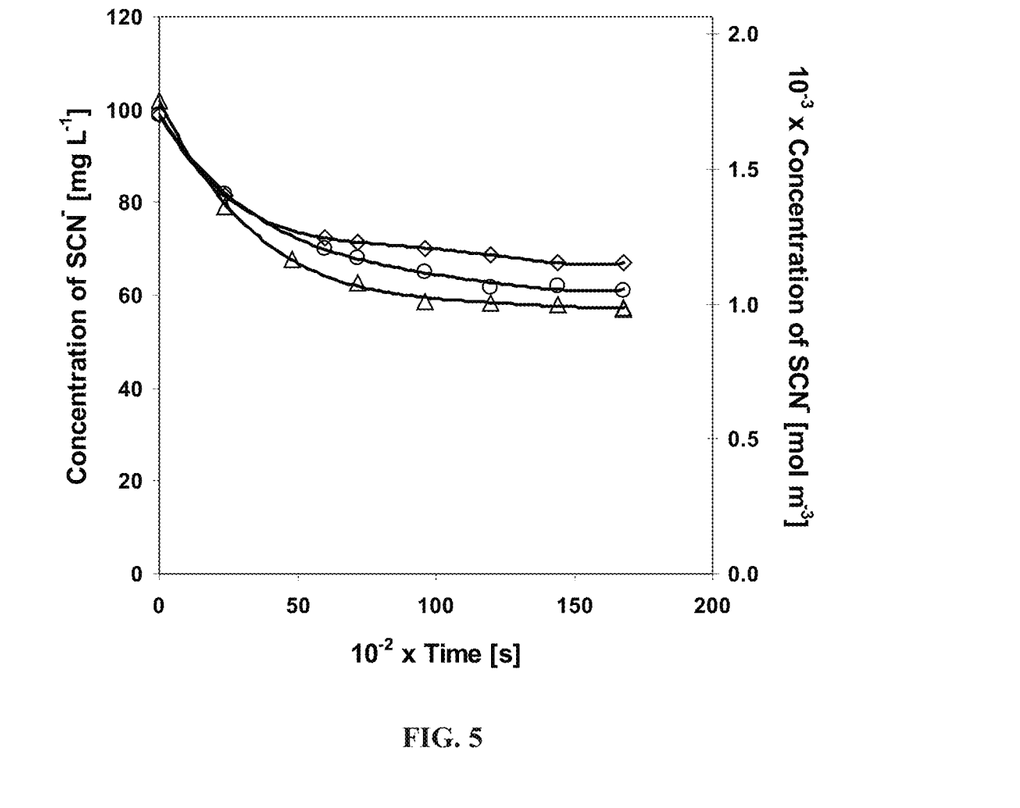
FIG. 5. Extraction of thiocyanate using PIMs (400±10 mg and diameter of 65 mm) containing (◇) 15% Aliquat 336, 10% 1-tetradecanol and 75% PVC; (○) 20% Aliquat 336, 5% 1-tetradecanol and 75% PVC; and (Δ) 20% Aliquat 336, 10% 1-dodecanol and 70% PVC. The bold lines correspond to the quadratic polynomials that best fit the experimental data.

The composition of the 1-tetradecanol PIM was optimized and the results presented in Table 4 suggest that similarly to the PIM containing 1-dodecanol the 1-tetradecanol membrane with the optimal extracting properties consisted of 20% Aliquat 336, 70% PVC and 10% modifier (i.e. 1-tetradecanol). The corresponding extraction data are shown in FIG. 5. They were fitted by a quadratic polynomial (Eq. (1)):

$$C = a_4 t^4 + a_3 t^3 + a_2 t^2 + a_1 t + a_0 \quad (1)$$

where C is the concentration of thiocyanate [mol $m^{-3}$], t is time [s] and $a_i$ are the polynomial coefficients, determined by the least squares method.

The initial flux values ($J_{t=0}$) were calculated by Eq. (2) after taking into account that $(dC/dt)_{t=0} = a_1$ (Eq. (1)).

$$J_{t=0} = -\frac{1}{S} V \left( \frac{dC}{dt} \right)_{t=0} = -\frac{V}{S} a_1 \quad (2)$$

where J is the flux (mol $m^{-2}$ $s^{-1}$), V=$2.50 \times 10^{-4}$ $m^3$ is the solution volume, and S=$6.63 \times 10^{-3}$ $m^2$ is the exposed surface area of the membrane.

TABLE 4

PIM and solution appearance after the completion of the thiocyanate extraction process and initial thiocyanate flux calculated for the 3 successful PIMs.

| | | Aliquat 336 ($10^6$ × Initial flux [mol m$^{-2}$ s$^{-1}$]) | | |
|---|---|---|---|---|
| | | 15% | 20% | 25% |
| 1-Tetradecanol | 5% | | (6.68) | Cloudy solution |
| | 10% | (5.96) | (7.86) | Cloudy Solution |
| | 15% | Opaque membrane | Opaque membrane | Cloudy solution |

2.1.4. Comparison of the Long-Term Stability of 1-Dodecanol and 1-Tetradecanol Based PIMs The long-term stability of PIMs incorporating 1-dodecanol and 1-tetradecanol as modifier was studied by conducting 10 consecutive cycles of extraction and back-extraction of thiocyanate. Since the back-extracting reagent was 1.0 M $NaNO_3$, the membranes were initially converted from the chloride form of Aliquat 336 to its nitrate form by conditioning the membrane for 20 h. in a 1.0 M $NaNO_3$ solution.

Figure 6A:
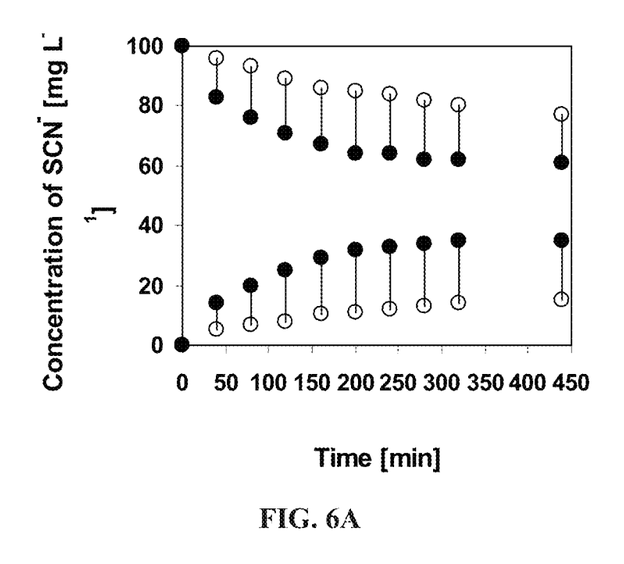
Figure 6B:
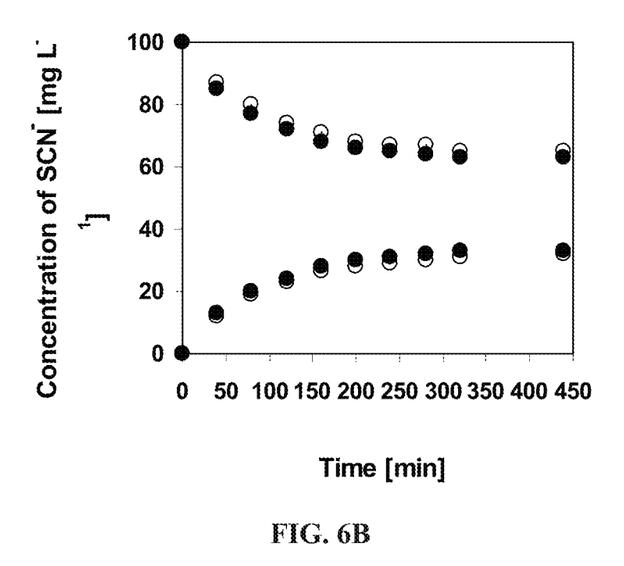

The gradual leaching of the modifier resulted in a decrease in the amount of thiocyanate extracted during each subsequent cycle thus suggesting that the loss of modifier was accompanied by loss of extractant. FIG. 6 shows the results for the first and last ($10^{th}$) extraction/back-extraction cycles in the case of 1-dodecanol (FIG. 6a) and 1-tetradecanol (FIG. 6b). These results clearly demonstrate that the membrane using 1-tetradecanol as modifier has considerably better stability over 10 cycles. Thus the PIM consisting of 20% Aliquat 336, 10% 1-tetradecanol and 70% PVC was selected as the optimal one for the treatment of tailing waters to remove thiocyanate.

2.2. Effect of Solution pH

Figure 7:
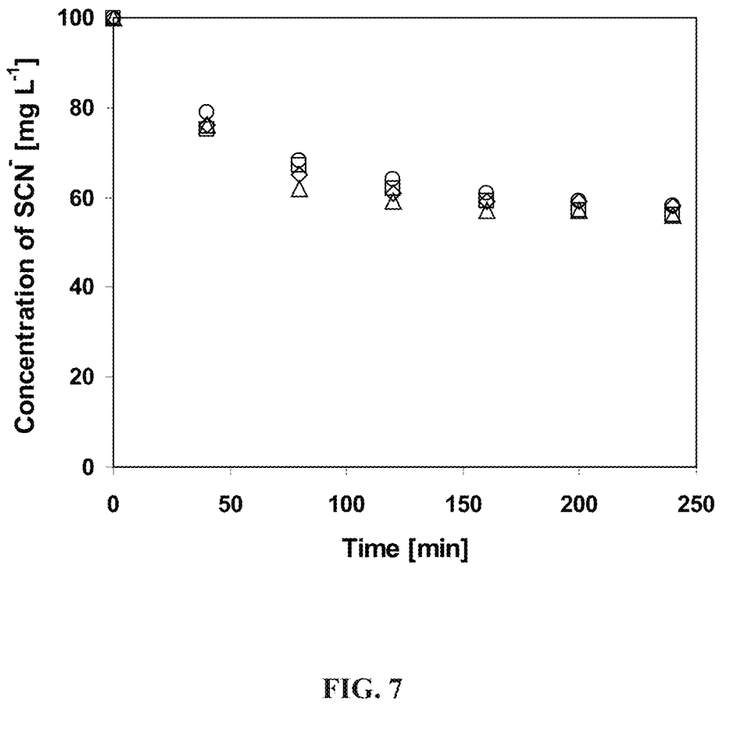
FIG. 7. Effect of solution pH (pH 7—□; pH 8—◇; pH 9—Δ; pH 10—○) on the extraction of thiocyanate into PIMs (400±10 mg; diameter of 65 mm; composition: 20% Aliquat 336, 70% PVC and 10% 1-tetradecanol).

The dependence of the extraction of thiocyanate on the solution pH was studied for the pH range from 7 to 10 which was considered as relevant to tailings waters in the gold mining industry. These experiments were carried out under a nitrogen atmosphere to exclude $CO_2$ and the extraction curves are shown in FIG. 7. The close agreement between all the extraction curves demonstrates that pH has a negligible effect on thiocyanate extraction over the pH range studied.

2.3. Extraction of Thiocyanate from Tailings Water

A preliminary study was carried out to assess the potential of the PIM with optimal composition (20% Aliquat 336, 10% 1-tetradecanol and 70% PVC) to extract thiocyanate from a 10 fold diluted tailings water. It was expected that competition from other anions present, and in particular cyanide, would be very low and that thiocyanate would be selectively extracted. This was found to be the case since the corresponding extraction curve was practically identical to those obtained using synthetic solutions of the same initial thiocyanate concentration (e.g. FIG. 7).

2.4. Long-Term Stability Studies of the Membrane During Continuous Transport of SCN The flow rates of the feed and receiving streams (identical in value) were varied to achieve greater than 97% transport of thiocyanate from the feed to the receiving stream. As expected the flow rate value depended on the number of membrane separation units connected in series which determined the membrane surface area exposed to each of the two solutions (Table 5).

TABLE 5

Results of flow rate and length of channel optimized for thiocyanate transport

| | SCN concentration in the feed stream (mg L$^{-1}$) | | |
|---|---|---|---|
| | 100 | 500 | 1000 |
| Flow rate (mL min$^{-1}$) | 0.074 | 0.042 | 0.028 |
| Length of channel (meters) | 2.05 | 4.10 | 6.15 |
| Surface area (cm$^2$) | 20.49 | 40.98 | 61.47 |

The long-term stability of the membrane was examined in the case of 100 and 1000 mg L$^{-1}$ thiocyanate concentrations in the feed stream. In the case of 100 mg L$^{-1}$ the membrane was found to transport thiocyanate at the same efficiency for 100 days. The testing of the membrane in the case of 1000 mg L$^{-1}$ thiocyanate concentration in the feed stream is currently in progress and so far the membrane has been operating without any deterioration in its performance for 36 days.

The invention claimed is:

1. A polymer inclusion membrane (PIM) for thiocyanate extraction, said PIM comprising:
   (i) about 10-20% wt/wt of a quaternary ammonium salt of formula (I)

(I)

wherein $R^1$ -$R^4$ are independently alkyl chains and $X^\ominus$ is an anion;
   (ii) about 5-30% wt/wt of a plasticizer/ modifier; and
   (iii) about 50% wt/wt of a polymer selected from the group consisting of poly(vinyl chloride), cellulose triacetate, and derivatives thereof.

2. A PIM according to claim 1 wherein the quaternary ammonium salt is a mixture of compounds of formula (I) where $R^1$ is methyl, $R^2$-$R^4$ are mixtures of $C_8$ (octyl) and $C_{10}$ (capryl) chains and $X^\ominus$ is chloride.

3. A PIM according to claim 1 wherein the plasticizer/ modifier is selected from the group consisting of tributylphosphate, 2-nitrophenyl octyl ether, 1-tetradecanol and 1-dodecanol.

4. A PIM according to claim 1 wherein the PIM is in the form of flat sheets or hollow fibre membranes.

5. A PIM according to claim 4 wherein the PIM is in the form of hollow fibre membranes of a density of about 20,000 to 30,000 m$^2$/m$^3$.

6. A PIM according to claim 2 wherein the plasticizer/ modifier is selected from the group consisting of tributylphosphate, 2-nitrophenyl octyl ether, 1-tetradecanol and 1-dodecanol.

7. A PIM according to claim 2 wherein the PIM is in the form of flat sheets or hollow fibre membranes.

8. A PIM according to claim 7 wherein the PIM is in the form of hollow fibre membranes of a density of about 20,000 to 30,000 m$^2$/m$^3$.

* * * * *